United States Patent

[11] 3,599,797

| [72] | Inventors | Henry M. Mikulski<br>Churchville;<br>Harold E. Bixler, Schwenksville, both of, Pa. |
|---|---|---|
| [21] | Appl. No. | 10,972 |
| [22] | Filed | Feb. 12, 1970 |
| [45] | Patented | Aug. 17, 1971 |
| [73] | Assignee | Met-Pro Water Treatment Corporation<br>Lansdale, Pa. |

[54] FILTER AND METHOD OF MAKING SAME
7 Claims, 6 Drawing Figs.

[52] U.S. Cl. .................................................. 210/496, 210/508
[51] Int. Cl. ...................................................... B01d 29/32
[50] Field of Search ........................................... 210/496, 508, 509

[56] References Cited
UNITED STATES PATENTS
2,746,608  5/1956  Briggs .......................... 210/508 X
3,375,931  4/1968  Sorenson ...................... 210/350

Primary Examiner—J. L. DeCesare
Attorney—Seidel, Gonda & Goldhammer

ABSTRACT: A filter mass is comprised of fibers coated with a polymer. The polymer coatings are bonded to each other. The fibers lie in approximately parallel planes with the net angle of the fibers being zero with respect to the direction of flow. The fibers are generally parallel to the direction of flow. The method includes compacting or pressurizing the polymer encapsulated coated fibers in a direction generally perpendicular to the intended direction of flow and then heating the thusly pressurized fibers by steam generated in a vessel. Selective control of porosity in different portions of the filter may be attained by varying the amount of pressure applied to the portions of the filter mass.

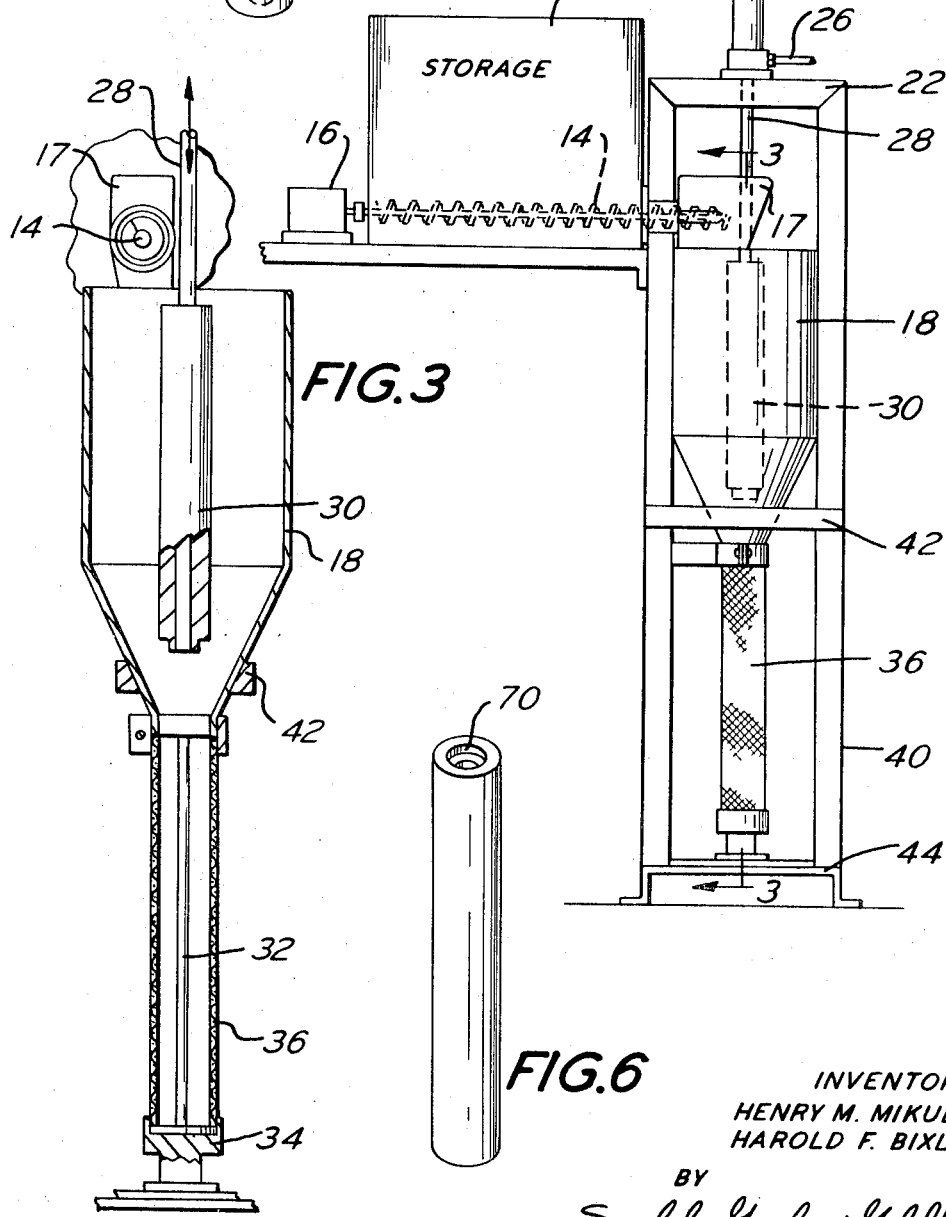

FILTER AND METHOD OF MAKING SAME

There are many types of filters, such as pleated paper, rovings associated with a perforated core, molded cartridges, etc. The filter of the present invention may be broadly classified as being of the molded cartridge type. The filter material used in accordance with this invention is a thermoplastic polymer coated fiber which may be a natural or synthetic fiber of the type disclosed in U.S. Pat. No. 3,121,698. The disclosure in said patent is incorporated herein by reference.

The filter of the present invention has the following advantages:

a. the filter can be constructed to have any given porosity;

b. For any given porosity, the filter has a low density of 3 to 8 grams per cubic inch;

c. With a pore size of one-half micron, the filter has a high pore volume of 80 to 90 percent and a high throughput of approximately 10 gallons per minute at 2 p.s.i. pressure differential.

The coated fibers lie in substantially parallel planes generally parallel to the direction of flow so as to have a net fiber angle of approximately zero with the direction of flow. Since the fibers are coated with a polymer, the fiber substrate does not contact the fluid being filtered and therefore is not subject to attack by said fluid. In addition to being usable for filtering out solid particles from a gas stream, other fluids may be filtered. Thus, the filter can be used as a liquid separator for coalescing liquids such as water from perchlorethylene or separating high surface tension liquids from liquids such as gasoline. If desired, activated carbon or other materials may be incorporated into the filter mass where adsorption is also desired. The method comprises placing fibers encapsulated in a polymer in a mold so that they occupy from 2 to 10 percent of the volume of the mold. Thereafter, the fibers are compressed by applying force in a direction generally perpendicular to the intended direction of flow. These steps are repeated until the desired filter mass is attained. Then the mold is placed into a pressure vessel wherein steam is generated to cause the polymer coatings to coalesce. After the filter mass has been subjected to the steam for a given period of time, it is removed from the mold and cooled.

If the filter is constructed so as to have zones of different porosity at different radii from the longitudinal axis, the thusly formed filter mass may be sealed at its ends in any convenient manner such as by applying a hot platen to the ends of the filter mass, thereby rendering them impervious to liquids. The ends may be subjected to a cutting step before the step of sealing the ends. The thusly constructed filter will be a self-supporting rigid structure which can withstand radial and axial loads in excess of 25 p.s.i. without substantial deformation. If higher load ratings are required, structural sections can be molded integrally with the fibers for added strength such as by use of reinforcing bars.

The filter of the present invention can be produced in any desired form including flat disks, hollow tubes, solid cylinders, etc.

The nature of the manufacturing process causes a gradation of the pore sizes. This gradation of pore sizes is in direct proportion to the density or amount of fibers per unit volume of the element. The manufacturing process can be varied so that the gradation of pore size can be with the larger size pores on the outer surface or on the inner surface as desired. Further, the size of the pores can be maintained substantially uniform. Since the pore size can be so maintained, the filter is not dependent on tortuous path entrapment for its filtration efficiency. Thus, the filter can exhibit the best properties of a screen-type filter. That is, it will trap all particles larger than its pores while passing substantial portions of particles smaller than its pores. If the density varies at different radii from the longitudinal axis, the filter can perform as a depth filter whereby progressively smaller particles will be trapped until the minimum size pores are obtained between the inner and outer peripheries of the filter.

It is an object of the present invention to provide a novel filter comprised of fibers coated with a polymer.

It is another object of the present invention to provide a filter whose pore size can be controlled.

It is another object of the present invention to provide a filter having a low density and high throughput.

It is another object of the present invention to provide a filter whose pore size can be controlled at a different radii from the longitudinal axis of the filter.

It is another object of the present invention to provide a novel method for making a filter.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a perspective view of one type of filter which can be made in accordance with the present invention.

FIG. 2 is a side elevation view of apparatus used in manufacturing the filter of the present invention and when practicing the method of the present invention.

FIG. 3 is a sectional view taken along the line 3–3 in FIG. 2.

FIG. 6 is a perspective view of one type of filter which is produced in accordance with the present invention when using a shaped ram.

Figure 4:
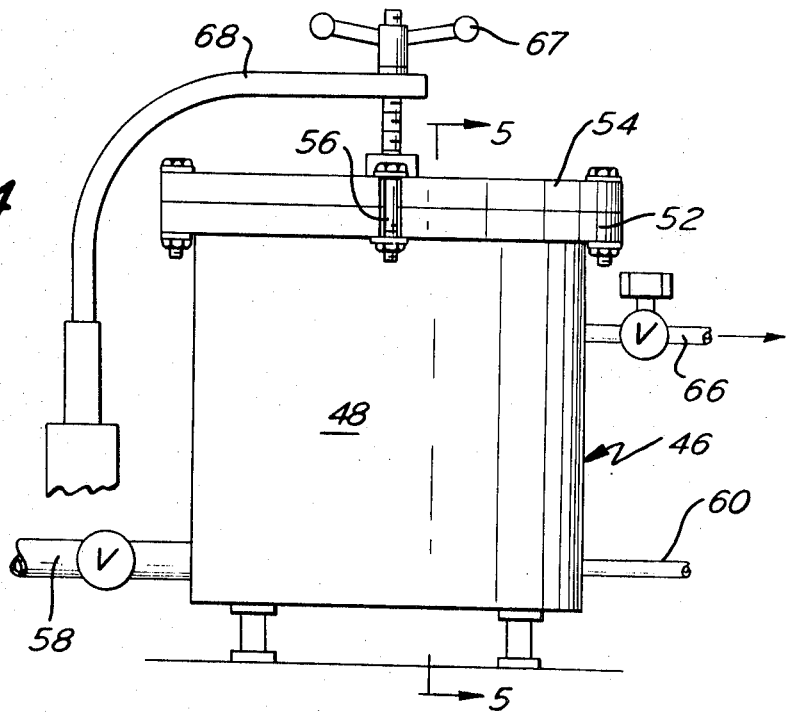
FIG. 4 is an elevation view of a pressure vessel used in practicing the method of the present invention.

Referring to the drawing in detail, wherein like numerals indicate like elements, there is shown in FIG. 1 a filter in accordance with the present invention designated generally as 10. As illustrated in FIG. 1, the filter 10 is a hollow cylindrical filter. As previously stated, the shape of the filter may be varied as desired. The filter comprises a mass having a controlled pore size defined by fibers encapsulated in a polymer. The polymer coatings of the fibers are bonded to each other. The fibers are generally parallel to each other so as to have a net angle of approximately zero while being generally parallel to the intended direction of flow. The direction of flow of the filter 10 would be in a radial direction. The ends of the filter mass are sealed so as to be impervious to fluids as will be described hereinafter.

For any given porosity, the filter 10 has a low density of between about 3 and 8 grams per cubic inch. For any given pore size, the filter 10 has a high pore volume of between 80 and 90 percent. The pore size may be as small as one-tenth micron. Nevertheless, the filter 10 has a high throughput. For example, with a pore size of one-half micron, the filter 10 has a throughput of 10 gallons per minute and a 2 p.s.i. pressure differential. Competitive filters of the same one-half micron pore size have a throughput of 0.25 gallons per minute at the same pressure differential.

Fibers encapsulated in a polymer as described above and in said above-mentioned U.S. patent are stored in a storage bin 12. The encapsulated fibers are discharged periodically from the storage bin 12 through a conduit 14 containing a feed screw connected to motor 16. The fibers discharged from conduit 14 are directed by guide plate 17 into a hopper or funnel 18. A cylinder 20 is mounted on a cross brace 22 of suitable framework above the hopper 18. Conduits 24 and 26 are provided on the cylinder 20 to permit the introduction and withdrawal of motive fluid for operating a piston disposed therewith. The piston is connected to the upper end of piston rod 28.

The lower end of piston rod 28 is connected to one end of a hollow ram 30. Ram 30 for purposes of illustration has a nonuniform end face. As shown more clearly in FIG. 3, the end face of ram 30 has a projection at it inner periphery for a purpose to be described hereinafter. The piston rod 28 and ram 30 extend through the hopper 18 and are adapted to compact the fibers into an outer mold 36 made from a perforated or screen mesh material. The ram 30 is hollow so that it may telescope over an inner mold 32. Inner mold 32 is in the form of a solid rod having a base 34 on which the outer mold 36 is supported. The upper end of mold 36 is sealingly connected to the lower end of the hopper 18 by any convenient clamp mechanism.

The motor 16 is periodically operated so as to discharge a quantity of encapsulated fibers into the hopper 18. The duration of operation of motor 16 is preferably controlled so that the amount of fibers introduced into hopper 18 constitutes approximately 2 to 10 percent of the unoccupied volume of the mold cavity defined by the inner and outer peripheral surfaces of molds 32 and 36. After each introduction of fibers into hopper 18, the ram 30 is moved downwardly so as to compress the fibers within the mold cavity. This process is repeated until the entirety of the mold cavity is filled or the desired filter mass is attained within the mold cavity.

The hopper 18 is supported by the framework which includes the vertical member 40, horizontal member 44, and the cross brace 42. When the mold is being filled, it is supported on the bottom member 44 of the framework. When the mold is filled so as to attain the desired filter mass, the clamp mechanism is released whereby the mold may now be placed into a heating means 46. See FIG. 4.

The heating means 46 includes a cup-shaped pressure vessel 48 having a bottom wall 50 supported by a plurality of legs. A radially outwardly directed flange 52 is provided at the upper end of the vessel 48. A cover 54 overlies the vessel 48 and its associated flange 52.

The cover 54 is removably attached to the vessel 48 in any convenient manner. As illustrated, the periphery of the cover 54 and the periphery of the flange 52 are provided with aligned notches within which are disposed bolts 56. The nuts on the bolts 56 retain the cover 54 and the vessel 48 in an airtight manner.

Figure 5:
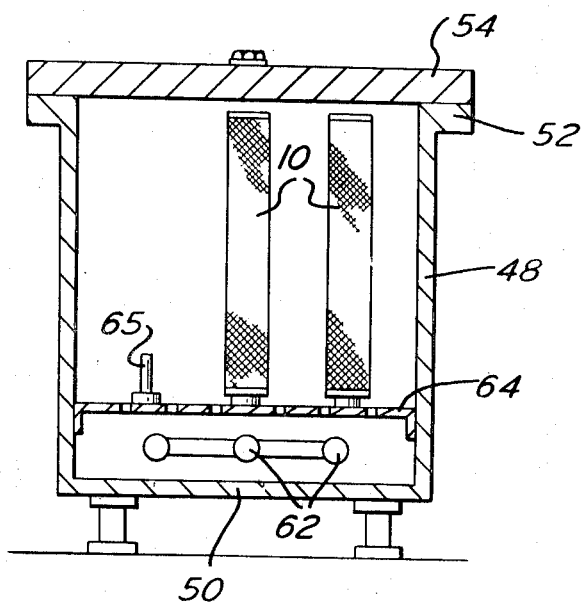
FIG. 5 is a sectional view taken along the line 5–5 in FIG. 4.

A conduit 58 containing a valve communicates with the vessel 48 adjacent the bottom thereof below a horizontal perforated platform 64. See FIG. 5. An electrical conduit 60 communicates with the interior of the vessel 48 and terminates in electrodes 62 which are disposed below the platform 64. The perforated platform 64 is provided with stubs 65 adapted to receive the molds containing the compressed fibers. A valved conduit 66 communicates with the chamber within vessel 48 above the level of platform 64 so that the steam therein may be discharged when desired.

The cover 54 is quite heavy. When it is desired to raise the cover 54, this may be accomplished by turning the handle 67 which is rotatably connected to cover 54 and threadedly coupled to the support arm 68. The support arm 68 is rotatably supported for rotation about a vertical axis. Hence, after the bolts 56 are removed, the cover may be raised slightly by rotating handle 67 and then the entire arm 68 may be rotated out of the way so as to provide access to the interior of vessel 48.

Molds comprised of the inner mold 32 and outer mold 36 are filled with fibers which are compressed by the ram 30 as described above. The pressure applied by the ram 30 may vary depending upon the mass. A suitable pressure would be 50 p.s.i. Due to the shaped end face of the ram 30, the density of the fibers immediately surrounding the inner mold 32 will be greater than the density of the fibers adjacent the inner periphery of the outer mold 36. For purposes of efficiency, a substantial number of molds will be filled with fibers in the manner described above.

The molds will be mounted on the stubs 65 within the vessel 48. Thereafter, the vessel 48 will be sealed closed and water will be introduced through conduit 58. When the prescribed amount of water has been introduced into the vessel 48, water will be shut off. The water is heated and converted into steam by the electrode 62 so as to attain a temperature of approximately 300—330° F. at pressure of about 70 to 150 p.s.i. for a period of approximately 30 minutes. During this time, the polymer coating on the fibers will soften and coalesce with adjacent coatings. The pressure is then relieved by controlling the valve in conduit 66. The molds are then removed and permitted to air-cool for 24 hours.

The cooled molds are then separated from the filter mass. The filter mass designated 70 is then blown clean and is illustrated in FIG. 6. If the filter mass 70 was formed while using the protrusion on the lower end of ram 30, that end of the mass 70 is preferably removed since it does not have the same density as the rest of mass 70. The end is preferably removed by cutting off an annular ring at the upper end of the filter mass 70. Thereafter, the filter mass will be trimmed to the desired length. Thereafter, the ends of the filter mass 70 will be rendered impervious to fluids by sealing the ends. The sealing of the ends can be accomplished by a heated flat iron.

With respect to the above-mentioned method, it will be noted that the heat transfer fluid, namely steam, is generated in situ within the vessel 48. No pressure is applied to the fibers while they are being subjected to heat within vessel 48. If the end face of ram 30 is flat, it will not be necessary to trim the ends of the filter mass 70. The trim may be refiberized and reused.

The high-pressure steam compresses the air in the pores of the filter mass and exerts a force on the fibers while squeezing the air from the pores. The vapor gradually drives the air from the pores of the filter mass and provides the heat and pressure required to soften and weld the thermoplastic coatings to each other. Monofilament fibers may be added to the filter mass during compression in the mold to increase the coarseness of the pores, if desired. Activated carbon granules may be dispersed throughout the fibers if adsorption is desired. More rapid heat transfer may be provided by using inner mold 32 in the form of a hollow perforated tube.

The temperature of the steam will be controlled so as to be above the softening temperature of the polymer coating on the fibers, but below the melting temperature of the coating on the fibers. As pointed out above, a suitable temperature range for polyethylene would be 300° to 330° F. A more general range covering most thermoplastics suitable for use in accordance with the present invention would be between 250° F. and 400° F.

A typical example of parameters which may be used in making a filter in accordance with the present invention is as follows. Base fibers having a diameter of 2 microns and a length of 25 microns and coated with polyethylene in an amount so as to have 50 percent fibers by weight were used to make a filler having a pore size of one-half micron. The ram pressure was about 35 p.s.i., the steam pressure was 100 p.s.i. (335° F.) and the time period within the pressure vessel was 30 minutes.

The present invention may be embodied in other specific forms without departing from the spirit or essential attributes thereof and, accordingly, reference should be made to the appended claims, rather than to the foregoing specification as indicating the scope of the invention.

We claim:

1. A method of making a filter comprising the steps of providing fibers which are incapsulated in a polymer; at least once sequentially introducing some of said fibers into a mold, applying pressure to said fibers while in said mold to compress them to define a filter having a pore volume of 80—90 percent and a density of 3—8 grams per cubic inch and to orient said fibers into approximately parallel planes which are generally parallel to the intended direction of fluid flow, and releasing said pressure while maintaining said compressed fibers within said mold; subjecting said compressed fibers to steam and pressure while in said mold; said steam being at a temperature sufficiently higher than the softening temperature of said polymer but below its melting temperature so that said steam comes into intimate contact with said compressed fibers to cause the coatings on adjacent fibers to coalesce; cooling said coalesced fibers and said mold; and removing said coalesced fibers from said mold.

2. A method in accordance with claim 1 wherein the amount of said fibers introduced into said mold in each of said sequences is between 2 and 10 percent of the volume of said mold; and all of said sequential steps are repeated until the desired filter mass is attained within said mold.

3. A method in accordance with claim 1 wherein the pressure applied to the fibers varies at different radii from the longitudinal axis of the filter.

4. A method in accordance with claim 1 comprising the steps of using molds which have an annular filter cavity for receiving the fibers, the mold using an outer mold which is perforated, said heating step including placing the molds in a chamber which is then sealed and steam is generated in the chamber at a temperature of between 250° and 400° F. at a pressure of 70 to 150 p.s.i.

5. A filter comprised of a plurality of fibers encapsulated in a polymer, said fibers lying generally parallel to each other and generally parallel to the intended direction of flow, the polymer coating of each of said fibers being bonded to the polymer coating of adjacent fibers to define a mass, said mass having a density of between 3 and 8 grams per cubic inch and a pore volume of 80—90 percent, and the ends of said mass parallel to said fibers is sealed.

6. A filter in accordance with claim 5 wherein the filter mass has zones of different porosity.

7. A filter in accordance with claim 5 wherein said filter mass is annular, the fibers extending in a generally radial direction, and said filter mass being a rigid structure.